(12) United States Patent
George et al.

(10) Patent No.: US 9,118,166 B2
(45) Date of Patent: *Aug. 25, 2015

(54) TUNING RARE EARTH ION EMISSION WAVELENGTH IN PHOSPHATE BASED GLASSES USING CERIUM OXIDE

(71) Applicant: SCHOTT CORPORATION, Elmsford, NY (US)

(72) Inventors: Simi George, Pittston, PA (US); Sally Pucilowski, Duryea, PA (US); Joseph Hayden, Clarks Summit, PA (US); Nathan Carlie, Waverly, PA (US)

(73) Assignee: SCHOTT CORPORATION, Elmsford, NY (US)

(*) Notice: Subject to any disclaimer, the term of this patent is extended or adjusted under 35 U.S.C. 154(b) by 195 days.

This patent is subject to a terminal disclaimer.

(21) Appl. No.: 13/687,307

(22) Filed: Nov. 28, 2012

(65) Prior Publication Data

US 2014/0146839 A1  May 29, 2014

(51) Int. Cl.
| | | |
|---|---|---|
| C03C 3/14 | (2006.01) | |
| C03C 3/19 | (2006.01) | |
| C03C 3/17 | (2006.01) | |
| C03C 3/068 | (2006.01) | |
| H01S 3/17 | (2006.01) | |
| H01S 3/16 | (2006.01) | |

(52) U.S. Cl.
CPC ............ *H01S 3/171* (2013.01); *C03C 3/068* (2013.01); *C03C 3/14* (2013.01); *C03C 3/17* (2013.01); *C03C 3/19* (2013.01); *H01S 3/16* (2013.01); *H01S 3/1608* (2013.01); *H01S 3/1611* (2013.01); *H01S 3/1618* (2013.01); *H01S 3/175* (2013.01)

(58) Field of Classification Search
CPC ............. C03C 3/14; C03C 3/19; C03C 3/17; C03C 3/068; C03C 4/007; C03C 4/12; C09K 11/7774; C09K 11/7777; C09K 11/7706; C09K 11/7709; H01S 3/175; H01S 3/176; H01S 3/1608; H01S 3/1618; H01S 3/1611
USPC ....... 501/45, 47, 48, 78; 252/301.4 P, 301.6 P
See application file for complete search history.

(56) References Cited

U.S. PATENT DOCUMENTS

| | | | | |
|---|---|---|---|---|
| 4,239,645 | A * | 12/1980 | Izumitani et al. | ....... 252/301.4 P |
| 4,770,811 | A | 9/1988 | Myers | |
| 4,962,067 | A | 10/1990 | Myers | |
| 5,032,315 | A * | 7/1991 | Hayden et al. | .......... 252/301.4 P |
| 5,164,343 | A | 11/1992 | Myers | |
| 5,322,820 | A * | 6/1994 | Myers et al. | ..................... 501/45 |
| 6,853,659 | B2 | 2/2005 | Hayden et al. | |
| 7,208,060 | B2 * | 4/2007 | Conzone et al. | ................. 156/99 |
| 7,531,473 | B2 * | 5/2009 | Myers | ............................. 501/45 |
| 2004/0212302 | A1 * | 10/2004 | Letz et al. | ...................... 313/512 |
| 2014/0146841 | A1 * | 5/2014 | George et al. | .................... 372/40 |

OTHER PUBLICATIONS

M.D. Perry and G. Mourou "Terrawatt to pettawatt subpicosecond lasers" Science, vol. 264, 917-924 (May 13, 1994).
Laser Focus World, Apr. 2008, pp. 19-20. http://www.laserfocusworld.com/content/lfw/en/articles/print/volume-44/issue-4/world-news/ultrafast-lasers-michigan-group-achieves-laser-intensity-record.html.
W. Koechner, Solid State Laser Engineering, 6ed, Springer Science, 2005 (pp. 534-542).
E. Gaul, M. Martinez, J. Blakeney, A. Jochmann, M. Ringuette, D. Hammond, T. Borger, R. Escamilla, S. Douglas, W. Henderson, G. Dyer, A. Erlandson, R. Cross, J. Caird, C. Ebbers, and T. Ditmire, "Demonstration of a 1.1 petawatt laser based on a hybrid optical parametric chirped pulse amplification/mixed Nd:glass amplifier," Applied Optics vol. 49, No. 9 [Mar. 20, 2010] pp. 1676-1681.
J. S. Hayden et al., "Effect of composition on the thermal, mechanical and optical properties of phosphate laser glasses," SPIE vol. 1277 (1990), 121-139.
Judd-Ofelt Theory, E. Desurvire, "Erbium Doped Fiber Amplifiers", John Wiley and Sons (1994), pp. 215-225.
W. J. Miniscalco et al. "General procedure for the analysis of Er3+ cross sections" Optics Letters vol. 16, No. 4, pp. 258-260 (1991).
Kassab et al., "GeO2—PbO—Bi2O3 glasses doped with Yb3+ for laser applications" Journal of Non-Crystalline Solids, 348 (2004) 103-107.
Catalin V. Filip "Atomic phase shifts in mixed-glass, multipetawatt laser systems," Optics Express, vol. 19, No. 21, [Oct. 10, 2011] pp. 20953-20959.
S.E Stokowski et al. "Nd-doped Laser Glass Spectroscopic and Physical Properties" Lawrence Livermore National Laboratory, University of California, M-95, Rev. 2, vol. 1, [Nov. 1981] 11 pages.
Fuchtbauer-Ladenburg Theory, E. Desurvire, "Erbium Doped Fiber Amplifiers" John Wiley and Sons (1994) pp. 244-255.

\* cited by examiner

*Primary Examiner* — Anthony J Green
*Assistant Examiner* — Elizabeth A Bolden
(74) *Attorney, Agent, or Firm* — Millen, White, Zelano, Branigan, P.C.

(57) ABSTRACT

The invention relates to a Nd-doped (and/or Yb-doped and/or Er-doped) phosphate laser glass having a peak emission wavelength that is shorter than 1054 nm. Cerium oxide ($CeO_2$) is incorporated into a phosphate glass host system, preferably in replacement of lanthanum oxide, to shift the peak emission wavelength to a wavelength shorter than 1054 nm. The invention further relates to a laser system using mixed-glass arrangement and phase compensation, wherein one of the glasses of the mixed glass system is an Nd-doped (and/or Yb-doped and/or Er-doped) phosphate laser glass having a peak emission wavelength that is shorter than 1054 nm, and a method of generating a laser beam pulse using such a laser system.

25 Claims, 1 Drawing Sheet

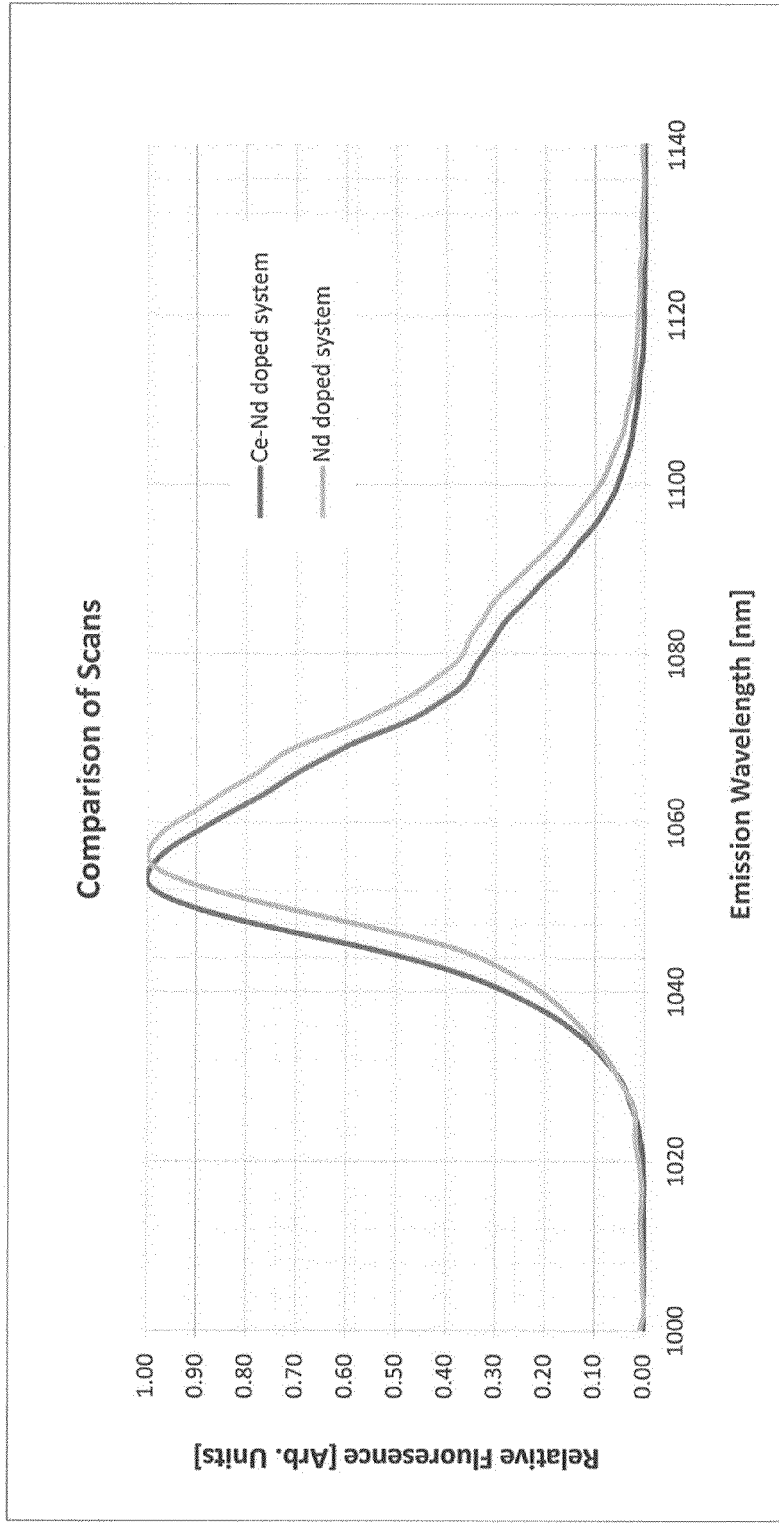

TUNING RARE EARTH ION EMISSION WAVELENGTH IN PHOSPHATE BASED GLASSES USING CERIUM OXIDE

This invention was made with Government support under FA9451-11-C-0274 awarded by AFRL/RDKL AF Research Agency of the Defense Department. The Government has certain rights in the invention.

SUMMARY OF THE INVENTION

The invention relates to glasses for use in solid laser applications, particularly short-pulse, high peak power laser applications. In particular, the invention relates to glasses for a mixed glass laser system wherein a phosphate laser glass is used in combination with an aluminate or silicate laser glass. Further, the invention relates to an Nd-doped phosphate glass, suitable for use in a mixed glass laser system, wherein the Nd-doped phosphate glass has a peak emission at a shorter wavelength, that is a wavelength below 1054 nm. In addition, the invention relates to a method of shifting the peak emission wavelength of an Nd-doped phosphate glass to a shorter wavelength without adversely impacting (i.e., narrowing) the emission bandwidth.

One general trend in solid state lasers is to make high energy lasers with shorter pulse lengths, which drives the power in the pulse to very high numbers. For example, a 10 k Joule laser with a 10 nsec pulse length is a power of 1 TW (1 TW=10000 J/10 nsec). The trend towards the use of high energy lasers with shorter pulse lengths is described in "Terrawatt to pettawatt subpicosecond lasers", M. D. Perry and G. Mourou, Science, Vol 264, 917-924 (1994).

In high power and short-pulse laser applications, such as the present petawatt laser systems and ultra-short pulsed lasers (lasers producing light pulses with a duration of, for example, one picosecond or less) as well as the future exawatt lasers systems, it is desirable that the solid-sate laser medium have a broad emission bandwidth. See, for example, the Hercules laser described in Laser Focus World, April 2008, pp. 19-20, which uses Ti doped sapphire crystals. An important factor in designing laser systems that utilize short pulses is to find gain materials with broad emission bandwidth for the laser transition.

For mode-locked lasers, it is a well-known result, from Fourier's theorem, that the narrower the pulse width, the larger the gain bandwidth required to generate that pulse; thus transform limited. For an inhomogeneously broadened line width of a laser medium, if the intensity of pulses follows a Gaussian function, then the resulting mode-locked pulse will have a Gaussian shape with the emission bandwidth/pulse duration relationship of: Bandwidth×Pulse Duration 0.44. See W. Koechner, Solid State Laser Engineering, 6ed, Springer Science, 2005 (pg 540). Clearly, to achieve ever shorter pulse durations it is a requirement to identify glasses with a broad emission bandwidth.

Titanium-sapphire [Ti:Sapphire, Ti:$Al_2O_3$] crystals have a broad emission bandwidth as well as high laser cross sections over a broad region of emission. These properties, in combination with the excellent thermal, physical and optical properties of the sapphire crystal, make this a gain material of choice for active solid-state ultra-short pulsed lasers. However, the short fluorescence lifetime necessitates the need for pumping Ti:Sapphire with other lasers (for example, Ti doped sapphire short pulse lasers are often pumped by glass lasers which in turn are pumped by flashlamps). This adds to the overall architecture and complexity of the lasers, particularly when attempting to scale up to exawatt peak powers. Moreover, being a crystalline material, generating large apertures of Ti:Sapphire material with the requisite optical qualities is challenging and expensive.

Another design for short pulsed lasers utilizes rare earth doped glasses. The advantages of such glasses over crystals include lower costs and higher available energies (since glass can be manufactured in large sizes of high optical quality, while Ti doped sapphire is limited in size). In addition, simpler designs can be implemented since the glass gain materials can be directly pumped by flashlamps. Unlike lasers using Ti:Sapphire crystals, the glass approach does not require one to first build pump lasers.

Laser glasses are produced by doping host glass systems with rare earth elements that have the ability to lase, such as neodymium and ytterbium. The lasing ability of these rare earth doped laser glasses results from the light amplification achieved by stimulated emission of the excited rare earth element ions within the glass.

Glasses have a proven track record as a host matrix suitable for rare-earth ions that provide the large apertures necessary for high average power laser systems. This is especially true for phosphate glasses which can be manufactured in large quantities and can be made platinum particle free, when manufactured under the right processing conditions.

In addition to phosphate glasses, tellurite, silicates, borates, borosilicates, and aluminates have also been used as host glass matrix systems for lasing ions. Silicate, borate, borosilicates, and aluminate glasses have broader emission bandwidth for Nd lasing ions, in comparison to phosphate glasses.

However, there are disadvantages associated with the use of these glasses. For example, silicate glasses normally melt at very high temperatures, unless they contain significant amount of modifiers, such as alkali metals or alkaline earths metals. Borate glasses, on the other hand, have low temperature melting characteristics, but require substantially high concentrations of alkali metals or alkaline earth metals to be stable in ambient environments. Borosilicate glasses can be durable at ambient temperatures and also are melted at temperatures comparable to standard commercial glasses, such as the soda-lime glasses. However, typical commercial borosilicate glasses contain significant amounts of alkali metals, which promote high borate volatility, similar to phosphate glass, during melting. Aluminate glasses exhibit particularly broad emission bandwidths and are attractive for short pulse laser operation. But, these glasses have a very high tendency towards crystallization with a record being exceptionally difficult to scale up to large scale manufacturing.

Unfortunately, the emission bandwidths achievable in glass hosts are typically many factors smaller than what is possible in the Ti:Sapphire crystal. For high peak power lasers using ultra-short pulses (<100 femto-second pulses or shorter), the emission bandwidths offered by known phosphate laser glasses are too narrow compared to what is needed. In order to overcome this limitation, so-called "mixed" laser glasses are used to achieve the total bandwidth requirement for the petawatt laser system that is in operation and producing the highest peak powers available today. The design of this petawatt laser is shown in, E. Gaul, M. Martinez, J. Blakeney, A. Jochmann, M. Ringuette, D. Hammond, T. Borger, R. Escamilla, S. Douglas, W. Henderson, G. Dyer, A. Erlandson, R. Cross, J. Caird, C. Ebbers, and T. Ditmire, "Demonstration of a 1.1 petawatt laser based on a hybrid optical parametric chirped pulse amplification/mixed Nd:glass amplifier," Appl. Opt. 49, 1676-1681 (2010). The laser design is shown in FIG. 1 whereas FIG. 2. shows the bandwidth achieved by using the glasses with shifted peak wavelengths.

In these mixed laser glass designs, phosphate and silicate glasses are used in series to achieve the total bandwidth required for current petawatt laser systems. See, for example, Filip, "Atomic phase shifts in mixed-glass, multipetawatt laser systems," Optic Express, Vol. 19, No. 21, pp. 20953-20959, Oct. 10, 2011 which describes a case study on a 15-petawatt laser based on Nd-doped mixed glasses. This mixed glass laser uses two amplifiers, one based on phosphate glass and the other based on silicate glass.

However, the present mixed laser glass designs are still insufficient for compact petawatt and for the future exawatt systems capable of producing high energies and short pulses. Mixed glass amplifiers with large enough apertures are expected to be one path forward for generating very high peak powers (100-1000 petawatt) and very short pulses (50-100 fs) in the future.

Thus, mixed glass amplifiers are expected to be one technology used in the future for high peak power, short pulse, multi-petawatt and exawatt laser systems. In these systems, the two glasses, each doped with $Nd^{3+}$ lasing ions will be used in series. However, the two glasses will have to provide vastly different peak emission wavelengths in order to be viable for the technology to be feasible. One of the glasses in the series will need the shortest possible emission peak for $Nd^{3+}$, while the other one will need the longest possible emission peak from $Nd^{3+}$. All other properties should be optimized for the best laser performance. In general, an Nd-doped phosphate glass is used for the shorter emission peak, and an Nd-doped silicate or aluminate glass is used for the higher emission peak. Most commercially available, large aperture, platinum free phosphate glasses have a peak wavelength near 1054 nm. The shortest peak wavelength available today for a commercially available, large aperture, platinum free phosphate glass is 1052.7 nm, and the longest commercially available peak wavelength in a glass is 1059.7 nm.

Thus, for high power, short pulsed laser systems, the need exists for Nd-doped laser glasses having peak emission wavelengths that are longer than 1059.7 and shorter than 1052.7 nm. There are known glasses that show peak wavelengths that are shorter and longer than these peaks. Most of these glasses have proven to be too difficult for high optical quality and large aperture production. See S. E Stokowski et al., Nd-doped Laser Glass Spectroscopic and Physical Properties, Lawrence Livermore National Laboratory, University of California, 1981.

The use of cerium oxide in laser glass is known. For example, Myers (U.S. Pat. No. 4,770,811) discloses a phosphate-based laser glass composition containing a lasing dopant such as $Nd_2O_3$, which further contains an auxiliary dopant consisting essentially of 0.1 to 5% by weight $Ce_2O_3$ and 0.025 to 0.1% $Cr_2O_3$. Cerium oxide can also be added as an antisolarant. See, for example, Meyers (U.S. Pat. No. 5,164,343) and Myers et al. (U.S. Pat. No. 7,531,473). Regarding the use of cerium in laser glass, see also Meyers (U.S. Pat. No. 4,962,067) and Hayden et al. (U.S. Pat. No. 6,853,659).

According to one aspect of the present invention is to provide a Nd-doped (and/or Yb-doped and/or Er-doped) phosphate laser glass having a peak emission wavelength that is shorter than 1054 nm, preferably at least 1052 nm nm or shorter, especially at least 1051 nm or shorter.

According to another aspect of the invention, there is provided a laser system using mixed-glass arrangement and phase compensation, wherein one of the glasses of the mixed glass system is an Nd-doped (and/or Yb-doped and/or Er-doped) phosphate laser glass having a peak emission wavelength that is shorter than 1054 nm, preferably at least 1052 nm nm or shorter, especially at least 1051 nm or shorter.

According to another aspect of the invention, there is provided a laser system wherein the power output of system is at least a pettawatt per pulse or greater, and wherein the system uses a mixed-glass arrangement and phase compensation and one of the glasses of the mixed glass system is an Nd-doped (and/or Yb-doped and/or Er-doped) phosphate laser glass having a peak emission wavelength that is shorter than 1054 nm, preferably at least 1052 nm nm or shorter, especially at least 1051 nm or shorter.

According to another aspect of the invention, a method is provided for decreasing the peak emission wavelength of an Nd-doped (and/or Yb-doped and/or Er-doped) phosphate laser glass by at least 2 nm, preferably at least 3 nm, especially at least 5 nm. For example, the method decreases the peak emission wavelength of a Nd-doped phosphate laser glass from an average wavelength of about 1054 nm to a peak emission wavelength that is shorter than 1054 nm, preferably at least 1052 nm nm or shorter, especially at least 1051 nm or shorter, and at least 1049 nm or shorter.

Upon further study of the specification and appended claims, further aspects and advantages of this invention will become apparent to those skilled in the art.

These aspects are achieved by incorporating cerium oxide ($CeO_2$) into a phosphate glass host system, preferably in replacement of lanthanum oxide, to shift the peak emission wavelength to a wavelength shorter than 1054 nm.

In accordance with an embodiment of the invention, there is provided a Nd-doped (or Yb-doped or Er-doped) phosphate glass composition comprising (based on mol %):

| | |
|---|---|
| $P_2O_5$ | 40.00-70.00 |
| $B_2O_3$ | 0.00-20.00 |
| $SiO_2$ | 0.00-15.00 |
| $Al_2O_3$ | 2.00-15.00 |
| $Nd_2O_3$ | 0.00-5.00 |
| $Yb_2O_3$ | 0.00-solubility limit |
| $Er_2O_3$ | 0.00-5.00 |
| $CeO_2$ (or an equivalent amount of $Ce_2O_3$) | 0.25-30.00 |
| $La_2O_3$ | 0.00-29.75 |
| MO | 0.00-10.00 |
| $M'_2O$ | 0.00-20.00 | wherein
  MO is the sum of MgO, CaO, SrO, BaO, and ZnO,
  $M'_2O$ is the sum of $Li_2O$, $Na_2O$, $K_2O$, and $Cs_2O$,
  the sum of MO and $M'_2O$ is 0.00-30.00 mol %,
  the sum of $P_2O_5$, $B_2O_3$, $SiO_2$, and $Al_2O_3$ is at least 46 mol %,
  all or a portion of $CeO_2$ can be replaced by an equivalent amount of $Ce_2O_3$, in which an equivalent amount of $Ce_2O_3$ means an amount having the same number of moles of Ce as an amount of $CeO_2$,
  the sum of $La_2O_3$, $CeO_2$, $Ce_2O_3$, $Nd_2O_3$, $Yb_2O_3$, and $Er_2O_3$ is not more than 35.00 mol %,
  solubility limit refers to the concentration which is the limit of solubility of $Yb_2O_3$ in the glass composition, and
  the glass contains at least 0.25 mol % $Nd_2O_3$ and/or at least 0.50 mol % $Yb_2O_3$ and/or at least 0.05 mol % $Er_2O_3$.

In accordance with a further embodiment of the invention, there is provided a Nd-doped (or Yb-doped or Er-doped or Yb+Er codoped or Er+Yb+Nd codoped or Yb+Nd codoped) phosphate glass composition comprising (based on mol %):

| | |
|---|---|
| $P_2O_5$ | 50.00-70.00 |
| $B_2O_3$ | 5.00-10.00 |
| $SiO_2$ | 1.00-10.00 |
| $Al_2O_3$ | 2.00-13.00 |
| $Nd_2O_3$ | 0.00-5.00 |
| $Yb_2O_3$ | 0.00-5.00 |
| $Er_2O_3$ | 0.00-5.00 |
| $CeO_2$ (or an equivalent amount of $Ce_2O_3$) | 0.5-25.00 |
| $La_2O_3$ | 0.00-22.00 | wherein
the sum of MO and M'$_2$O is 0.00-20.00 mol %,
the sum of $P_2O_5$, $B_2O_3$, $SiO_2$, and $Al_2O_3$ is at least 58 mol % (e.g., 65 mol %), all or a portion of $CeO_2$ can be replaced by an equivalent amount of $Ce_2O_3$, in which an equivalent amount of $Ce_2O_3$ means an amount having the same number of moles of Ce as an amount of $CeO_2$,
the sum of $La_2O_3$, $CeO_2$, $Ce_2O_3$, $Nd_2O_3$, $Yb_2O_3$, and $Er_2O_3$ is not more than 35.00 mol %, and
the sum of $Nd_2O_3$, $Yb_2O_3$, and $Er_2O_3$ is 0.25-5.00 mol, and the glass contains at least 0.25 mol % $Nd_2O_3$ and/or at least 0.50 mol % $Yb_2O_3$ and/or at least 0.05 mol % $Er_2O_3$.

According to another aspect of the invention there is provided a method of shortening the peak emission wavelength of an Nd-doped (or Yb-doped or Er-doped) phosphate laser glass which contains lanthanum, comprising replacing up to 100% of $La_2O_3$ with $CeO_2$.

According to another aspect of the invention, the glass composition contains less than 0.01 $Cr_2O_3$.

According to another aspect of the invention, the glass composition contains $SiO_2$, for example, 1.00-15.00 mol %. According to another aspect of the invention, the glass composition contains $B_2O_3$, i.e., >0.00-20.00 mol %, such as 0.5-20.00 mol %. According to another aspect of the invention, the glass composition contains both $SiO_2$ and $B_2O_3$.

With regards to ranges described herein, all ranges include at least the two endpoints of the ranges, as well as all units between the two endpoints. Thus, for example, a range of 1 to 10 is to be understood as expressly disclosing at least the values of 1, 2, 3, 4, 5, 6, 7, 8, 9, and 10.

In the glass composition according to the invention, $P_2O_5$ functions as the source of the primary network former. Thus, according to another aspect of the invention, the Nd-doped (and/or Yb-doped and/or Er-doped) phosphate glass composition contains 45.00-70.00 mol % of $P_2O_5$, such as 55.00-70.00 mol % $P_2O_5$, or 60.00-70.00 mol % $P_2O_5$, or 62.00-66.00 mol % $P_2O_5$, for example, 55, 56, 57, 58, 59, 60, 61, 62, 63, 64, 65, 66, 67, 68, 69, or 70 mol %.

In the glass composition according to the invention, $B_2O_3$ also acts as a network former. According to another aspect, the Nd-doped (and/or Yb-doped and/or Er-doped) phosphate glass composition contains 0.00-20.00 mol % of $B_2O_3$, such as 1, 2, 3, 4, 5, 6, 7, 8, 9, 10, 11, 12, 13, 14, 15, 16, 17, 18, 19, or 20 mol %. For example, the phosphate glass composition according to the invention may contain 5.00-20.00 mol % of $B_2O_3$, or 5.00-15.00 mol % $B_2O_3$, or 5.00-10.00 mol % $B_2O_3$, or 8.00-10.00 mol % $B_2O_3$.

$SiO_2$ can also act as a network former in the glass composition of the invention. According to another aspect, the Nd-doped (and/or Yb-doped and/or Er-doped) phosphate glass composition contains 0.00-15.00 mol % of $SiO_2$, such as 1, 2, 3, 4, 5, 6, 7, 8, 9, 10, 11, 12, 13, 14, or 15 mol %. For example, the phosphate glass composition according to the invention may contain 1.00-10.00 mol % $SiO_2$, or 3.00-10.00 mol % $SiO_2$, or 3.00-6.00 mol % $SiO_2$.

$Al_2O_3$ can also act as a network former in the glass composition of the invention. According to another aspect, the Nd-doped (or Yb-doped or Er-doped) phosphate glass composition contains 2.00-15.0 mol % of $Al_2O_3$, such 3, 4, 5, 6, 7, 8, 9, or 10 mol %. For example, the phosphate glass composition according to the invention may contain 2.00-14.00 mol % $Al_2O_3$, or 2.00-10.00 mol % $Al_2O_3$, or 2.00-8.00 mol % $Al_2O_3$, or 4.00-8.00 mol % $Al_2O_3$.

The Nd, Yb, and/or Er ions function as lasing ions in the glass according to the invention. According to another aspect, a Nd-doped phosphate glass composition according to the invention contains 0.25-5.00 mol % of $Nd_2O_3$, such 0.3, 0.4, 0.5, 0.6, 0.75, 0.8, 0.9, 1, 1.25, 1.5, 1.75, 2, 2.5, 3, 3.5, 4, 4.5, or 5 mol %. For example, the phosphate glass composition according to the invention may contain 0.25-4.00 mol % $Nd_2O_3$, or 0.25-3.00 mol % $Nd_2O_3$, or 0.25-2.00 mol % $Nd_2O_3$.

According to another aspect, a Yb-doped phosphate glass composition according to the invention contains 0.50-30.00 mol % of $Yb_2O_3$, such 0.5, 0.6, 0.7, 0.75, 0.8, 0.9, 1.0, 1.25, 1.5, 1.75, 2.0, 2.5, 3.0, 3.5, 4.0, 4.5, 5.0, 6.0, 7.0, 8.0, 10.0, 12.0, 15.0, 18.0, 20.0, 23.0, 25.0, 28.0 or 30.0 mol %. For example, the phosphate glass composition according to the invention may contain 0.50-25.00 mol % $Yb_2O_3$, or 0.50-15.00 mol % $Yb_2O_3$, or 0.50-10.00 mol % $Yb_2O_3$, or 0.50-5.00 mol % $Yb_2O_3$.

According to another aspect, the Er-doped phosphate glass composition according to the invention contains 0.05-10.00 mol % of $Er_2O_3$, such 0.1, 0.2, 0.3, 0.4, 0.5, 0.6, 0.75, 0.8, 0.9, 1.0, 1.25, 1.5, 1.75, 2.0, 2.5, 3.0, 3.5, 4.0, 4.5, or 5.0 mol %. For example, the phosphate glass composition according to the invention may contain 0.05-4.00 mol % $Er_2O_3$, or 0.05-3.00 mol % $Er_2O_3$, or 0.05-2.00 mol % $Er_2O_3$.

According to another aspect, the doped phosphate glass composition according to the invention contains a total amount of two or more of the dopants $Nd_2O_3$, $Yb_2O_3$, and $Er_2O_3$ of 0.50-5.00 mol %, such 0.5, 0.6, 0.75, 0.8, 0.9, 1.0, 1.25, 1.5, 1.75, 2.0, 2.5, 3.0, 3.5, 4.0, 4.5, or 5.0 mol %. For example, the phosphate glass composition according to the invention may contain 1.00-4.00 mol %, or 1.00-3.00 mol %, or 1.00-2.00 mol %.

According to another aspect, the Nd-doped phosphate glass composition according to the invention contains 0.25-30.00 mol % of $CeO_2$, such 0.5, 0.75, 1.0, 1.25, 1.5, 1.75, 2.0, 2.5, 3.0, 3.5, 4.0, 4.5, 5.0, 6.0, 7.0, 8.0, 9.0, 10.0, 12.0, 15.0, 16.0 17.0, 18.0 19.0, 21.0, 23.0, 25.0, 28.0, or 30.0 mol %. For example, the phosphate glass composition according to the invention may contain 4.50-25.00 mol % $CeO_2$, or 10.00-25.00 mol % $CeO_2$, or 15.00-25.00 mol % $CeO_2$, or 20.00-25.00 mol % $CeO_2$.

According to another aspect, the Nd-doped phosphate glass composition according to the invention contains up to 15.00 mol % of $Ce_2O_3$, such 0.2, 0.3, 0.4, 0.5, 0.6, 0.7, 0.8, 0.9, 1.0, 1.25, 1.5, 1.75, 2.0, 2.5, 3.0, 3.5, 4.0, 4.5, or 5.0 mol %. For example, the phosphate glass composition according to the invention may contain 5.00-12.50 mol % $Ce_2O_3$, or 7.50-12.50 mol % $Ce_2O_3$, or 10.00-12.50 mol % $Ce_2O_3$.

According to another aspect, the Nd-doped phosphate glass composition according to the invention contains 0.00-29.75 mol % of $La_2O_3$, such 0.5, 0.75, 1.0, 1.25, 1.5, 1.75, 2.0, 2.5, 3.0, 3.5, 4.0, 4.5, 5.0, 6.0, 7.0, 8.0, 9.0, 10.0, 12.0, 15.0, 16.0 17.0, 18.0 19.0, 21.0, 23.0, 25.0, 28.0, or 29.0 mol %. For example, the phosphate glass composition according to the invention may contain 0.00-15.0 mol % $La_2O_3$, 0.00-10.0 mol % $La_2O_3$, 0.00-8.0 mol % $La_2O_3$, 0.00-5.0 mol % $La_2O_3$, 0.00-3.0 mol % $La_2O_3$, 0.00-2.50 mol % $La_2O_3$, or 0.00-2.00 mol % $La_2O_3$, or 0.00-1.00 mol % $La_2O_3$.

As indicated above, the glass composition according to the invention may include alkali metals, M'$_2$O (sum of Li$_2$O, Na$_2$O, K$_2$O, and Cs$_2$O), in amounts of 0.00-20.00 mol %, for example, 0.0, 1.0, 2.0, 3.0, 4.0, 5.0, 6.0, 7.0, 8.0, 9.0, 10.0, 11.0, 12.0, 13.0, 14.0, 15.0, 16.0, 17.0, 18.0, 19.0, or 20.0 mol %. For example, the glass composition according to the invention may contain 0.0-10.0 mol %, 0.0-8.0 mol %, 0.0-5.0 mol %, or 0.0-3.0 mol % of alkali metals, M'$_2$O. The alkali metals can be added to the glass composition to further modify laser and mechanical properties of the glass system. See, for example, J. S. Hayden et al., "Effect of composition on the thermal, mechanical and optical properties of phosphate laser glasses," SPIE Vol. 1277 (1990), 127-139.

Also, as indicated above, the glass composition according to the invention may include alkaline earth metals, MO (sum of MgO, CaO, SrO, BaO, and ZnO), in amounts of 0.00-10.00 mol %, for example, 0.0, 1.0, 2.0, 3.0, 4.0, 5.0, 6.0, 7.0, 8.0, 9.0, or 10.0 mol %. For example, the glass composition according to the invention may contain 0.0-9.0 mol %, 0.0-7.0 mol %, 0.0-5.0 mol %, or 0.0-4.0 mol %, or 0.0-3.0 mol % of alkaline earth metals, MO. The alkaline earth metals can be added to the glass composition to further modify laser and mechanical properties of the glass system. See, for example, J. S. Hayden et al., "Effect of composition on the thermal, mechanical and optical properties of phosphate laser glasses," SPIE Vol. 1277 (1990), 127-139.

In the glass composition according to the invention may include alkali metals and the alkaline earth metals, i.e., the sum of MO and M'$_2$O, is 0.00-30.00 mol %, for example, 0.0-25.0 mol %, 0.0-22.0 mol %, 0.0-20.0 mol %, or 0.0-15.0 mol %, or 0.0-10.0 mol %.

With regards to the additional components, the glass may contain a maximum of 4 weight percent, especially a maximum of 2 weight percent, of conventional additives or impurities, such as refining agents (e.g., As$_2$O$_3$ and Sb$_2$O$_3$) and antisolarants (e.g., Nb$_2$O$_5$). In addition, the glass composition may contain halides to help dry the melt or residual water and to help refining of the glass. For example, the glass composition may contain up to 9 wt % F, preferably not more 5 wt %, and, up to 5 wt % Cl, although Cl is less preferred than F.

In accordance with another aspect of the invention, the doped phosphate glass compositions according to the invention possesses an effective emission bandwidth ($\Delta\lambda_{eff}$) of at least 20 nm, preferably at least 25 nm, especially at least 29 nm, and in particular at least 32 nm, for example 25-35 nm or 29-33 nm.

Laser properties can be measured in accordance with the Judd-Ofelt theory, the Fuchtbauer-Ladenburg theory, or the McCumber method. A discussion of the Judd-Ofelt theory and the Fuchtbauer-Ladenburg theory can be found in E. Desurvire, *Erbium oped Fiber Amplifiers*, John Wiley and Sons (1994). The McCumber method is as discussed in, for example, Miniscalco and Quimby, Optics Letters 16(4) pp 258-266 (1991). See also Kassab, Journal of Non-Crystalline Solids 348 (2004) 103-107. The Judd-Ofelt theory and the Fuchtbauer-Ladenburg theory evaluate laser properties from an emission curve, whereas the McCumber method uses the absorption curve of the glass.

Regarding emission bandwidth, if one has a measured emission curve (such as collected in a Judd-Ofelt or Fuchtbauer-Ladenburg analysis) or a calculated emission curve (from a McCumber analysis) one can get emission bandwidth in two ways. The first way is to simply measure the width at half of the maximum value (called emission bandwidth full width half maximum or $\Delta\lambda_{FWHM}$).

The second method divides every point on the emission curve by the total area under the curve. The result, called a linewidth function, will have a peak value that is defined as the inverse of the effective bandwidth, $\Delta\lambda_{eff}$. By this method the entire emission curve always contributed to the emission bandwidth result. It is this value used herein in the analysis as the best indicator of emission bandwidth.

BRIEF DESCRIPTION OF THE DRAWINGS

The invention and further details, such as features and attendant advantages, of the invention are explained in more detail below on the basis of the exemplary embodiments which are diagrammatically depicted in the drawings, and wherein:

FIG. 1 graphically illustrates the observed shift in Nd-emission in an Nd-doped phosphate glass system containing Ce.

EXAMPLES

Table 1 lists an Nd-doped phosphate base glass containing La$_2$O$_3$ (LaNd) and an Nd-doped phosphate glass in accordance with the invention which contains CeO$_2$. Table 2 lists the laser properties of the two compositions.

All of the glasses were made using laser grade ingredients and melted under a dry oxygen environment with the help of stirring using a platinum stirrer for better homogeneity. All of the glasses were cast into a mold and this was appropriately annealed in order to remove the stress as the liquid cools to the amorphous state. The resulting glass slab was shaped into forms required for use with the instruments that provide various properties for glasses.

TABLE 1

| Metal Oxide Content | Examples | | | | |
|---|---|---|---|---|---|
| (Mol %) | Ex A | Ex 1 | Ex B | Ex 2 | Ex 3 |
| S$_i$O$_2$ | 4.001 | 4.001 | 7.15 | 7.15 | 6.88 |
| B$_2$O$_3$ | 7.992 | 7.992 | 8.25 | 8.25 | 7.94 |
| Al$_2$O$_3$ | 4.001 | 4.001 | 9.28 | 9.28 | 8.93 |
| P$_2$O$_5$ | 65.955 | 65.955 | 64.98 | 64.98 | 62.53 |
| MgO | | | 2.01 | 2.01 | 1.93 |
| Li$_2$O | | | 6.87 | 6.87 | 6.61 |
| CeO$_2$ | 0.0 | 17.200 | 0.0 | 1.10 | 4.81 |
| Nd$_2$O$_3$ | 1.00 | 0.851 | 0.35 | 0.35 | 0.36 |
| La$_2$O$_3$ | 17.051 | 0.0 | 1.10 | 0.0 | 0.0 |
| Total | 100.0 | 100.0 | 100.0 | 100.0 | 100.0 |

TABLE 2

Laser Properties of Example Compositions

| Laser Property | Examples | | | | |
|---|---|---|---|---|---|
| | Ex A | Ex 1 | Ex B | Ex 2 | Ex 3 |
| Peak Emission Wavelength, $\lambda_{Peak}$ [nm] (Judd-Ofelt) | 1055.72 | 1053.33 | 1053.00 | 1052.40 | 1052.22 |
| Effective Emission Bandwidth, $\Delta\lambda_{eff}$ [nm] (Judd-Ofelt) | 33.45 | 31.92 | 29.80 | 29.03 | 31.11 |
| Peak Emission Cross Section, $\sigma_{em}$ [$10^{-20}$ cm$^2$] (Judd-Ofelt) | 2.23 | 2.733 | 3.6 | 3.5 | 3.2 |

TABLE 2-continued

Laser Properties of Example Compositions

| | Examples | | | | |
|---|---|---|---|---|---|
| Laser Property | Ex A | Ex 1 | Ex B | Ex 2 | Ex 3 |
| FWHM Emission Bandwidth, $\Delta\lambda_{FWHM}$ [nm] (Judd-Ofelt) | 27.2 | 26.9 | 25.3 | 24.7 | 27.2 |
| Fluorescence Lifetime, τ [msec] | 434.84 | 356.94 | 316 | 348 | 340 |
| Judd-Ofelt Parameter, $\Omega_2$ [$10^{-20}$ cm$^2$] | 5.005 | 5.839 | 6.1 | 5.9 | 5.6 |
| Judd-Ofelt Parameter, $\Omega_4$ [$10^{-20}$ cm$^2$] | 3.497 | 5.393 | 5.8 | 4.8 | 5.0 |
| Judd-Ofelt Parameter, $\Omega_6$ [$10^{-20}$ cm$^2$] | 3.862 | 4.225 | 5.6 | 5.5 | 5.4 |

TABLE 3

Mechanical Properties of Example Compositions

| | Examples | | | | |
|---|---|---|---|---|---|
| Mechanical Property | Ex A | Ex 1 | Ex B | Ex 2 | Ex 3 |
| $CTE_{20-300c}$ ($10^{-7}$/K) | 68.7 | 63.9 | 69.8 | 70.7 | 72.9 |
| Glass Transition Temperature, $T_g$ (° C.) | 650 | 654 | 570 | 582 | 580 |
| Thermal Conductivity, (Watts/mK) 25° C. | 0.5184 | 0.5820 | 0.8041 | 0.9207 | 0.8544 |
| Thermal Conductivity, (Watts/mK) 90° C. | 0.6573 | 0.7013 | 0.966 | 0.9737 | 0.8969 |
| Knoop Hardness, HK, (kp/mm$^2$) | 417.5 | 419.3 | 480 | 545.0 | 491.0 |

As can be seen from the data in the Tables, replacing the $La_2O_3$ in Example A with $CeO_2$ in Example 1 resulted in the peak emission wavelength being shortened by more than 2 nm in the phosphate glass. Comparing Example B with Examples 2 and 3, replacing the $La_2O_3$ with $CeO_2$ resulted in the peak emission wavelength being shortened by more than 1.5 nm in the phosphate glass. Moreover, comparing Example A with Example 1, the addition of the $CeO_2$ improved the peak emission cross section. In Examples 2 and 3, the addition of the $CeO_2$ improved the fluorescence lifetime.

The entire disclosure[s] of all applications, patents and publications, cited herein, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A Nd-doped or Yb-doped or Er-doped phosphate glass composition comprising (based on mol %):

| | |
|---|---|
| $P_2O_5$ | 40.00-70.00 |
| $B_2O_3$ | 0.00-20.00 |
| $SiO_2$ | 0.00-15.00 |
| $Al_2O_3$ | 2.00-15.00 |
| $Nd_2O_3$ | 0.00-5.00 |
| $Yb_2O_3$ | 0.00-solubility limit |
| $Er_2O_3$ | 0.00-5.00 |
| $CeO_2$ (or an equivalent amount of $Ce_2O_3$) | 0.25-30.00 |
| $La_2O_3$ | 0.00-29.75 |
| MO | 0.00-10.00 |
| M'$_2$O | 0.00-15.00 | wherein

MO is the sum of MgO, CaO, SrO, BaO, and ZnO,

M'$_2$O is the sum of $Li_2O$, $Na_2O$, $K_2O$, and $Cs_2O$, the sum of MO and M'$_2$O is 0.0-15.0 mol %, the sum of $P_2O_5$, $B_2O_3$, $SiO_2$, and $Al_2O_3$ is at least 46 mol %, all or a portion of $CeO_2$ can be replaced by an equivalent amount of $Ce_2O_3$, in which an equivalent amount of $Ce_2O_3$ means an amount having the same number of moles of Ce as an amount of $CeO_2$, the sum of $La_2O_3$, $CeO_2$, $Ce_2O_3$, $Nd_2O_3$, $Yb_2O_3$, and $Er_2O_3$ is not more than 35.00 mol %, solubility limit refers to the concentration which is the limit of solubility of $Yb_2O_3$ in the glass composition, the glass contains $SiO_2$ and/or $B_2O_3$, and the glass contains at least 0.25 mol % $Nd_2O_3$ and/or at least 0.50 mol % $Yb_2O_3$ and/or at least 0.05 mol % $Er_2O_3$.

2. The Nd-doped or Yb-doped or Er-doped phosphate glass composition according to claim 1, wherein said glass composition contains less than 0.01 $Cr_2O_3$.

3. The Nd-doped or Yb-doped or Er-doped phosphate glass composition according to claim 1, wherein said glass composition contains 1.00-15.00 mol % $SiO_2$.

4. The Nd-doped or Yb-doped or Er-doped phosphate glass composition according to claim 1, wherein said glass composition contains >0.00-20.00 mol % $B_2O_3$.

5. The Nd-doped or Yb-doped or Er-doped phosphate glass composition according to claim 1, wherein said glass composition contains 0.5-20.00 mol % $B_2O_3$.

6. The Nd-doped or Yb-doped or Er-doped phosphate glass composition according to claim 1, wherein said glass composition contains $SiO_2$ and $B_2O_3$.

7. The Nd-doped or Yb-doped or Er-doped phosphate glass composition according to claim 1, wherein said glass composition contains 55.00-70.00 mol % $P_2O_5$.

8. The Nd-doped or Yb-doped or Er-doped phosphate glass composition according to claim 1, wherein said glass composition contains 5.00-15.00 mol % $B_2O_3$.

9. The Nd-doped or Yb-doped or Er-doped phosphate glass composition according to claim 1, wherein said glass composition contains 1.00-10.00 mol % $SiO_2$.

10. The Nd-doped or Yb-doped or Er-doped phosphate glass composition according to claim 1, wherein said glass composition contains 1.00-4.00 mol % $Nd_2O_3$.

11. The Nd-doped or Yb-doped or Er-doped phosphate glass composition according to claim 1, wherein said glass composition contains 0.50-30.00 mol % $Yb_2O_3$.

12. The Nd-doped or Yb-doped or Er-doped phosphate glass composition according to claim 1, wherein said glass composition contains 0.50-4.00 mol % $Er_2O_3$.

13. The Nd-doped or Yb-doped or Er-doped phosphate glass composition according to claim 1, wherein said glass composition contains two or more of $Nd_2O_3$, $Yb_2O_3$, and $Er_2O_3$ in a total amount of 0.50-5.00 mol %.

14. The Nd-doped or Yb-doped or Er-doped phosphate glass composition according to claim 1, wherein said glass composition contains 10.00-25.00 mol % $CeO_2$.

15. The Nd-doped or Yb-doped or Er-doped phosphate glass composition according to claim 14, wherein said glass composition contains 15.00-25.00 mol % $CeO_2$.

16. The Nd-doped or Yb-doped or Er-doped phosphate glass composition according to claim 14, wherein said glass composition contains 20.00-25.00 mol % $CeO_2$.

17. The Nd-doped or Yb-doped or Er-doped phosphate glass composition according to claim 1, wherein said glass composition contains 5.00-12.50 mol % $Ce_2O_3$.

18. The Nd-doped or Yb-doped or Er-doped phosphate glass composition according to claim 1, wherein said glass composition contains up to 12.50 mol % $Ce_2O_3$.

19. The Nd-doped or Yb-doped or Er-doped phosphate glass composition according to claim 1, wherein said glass composition contains 0.00-15.0 mol % $La_2O_3$.

20. The Nd-doped or Yb-doped or Er-doped phosphate glass composition according to claim 1, wherein said glass has an effective emission bandwidth ($\Delta\lambda_{eff}$) of at least 20 nm.

21. The Nd-doped or Yb-doped or Er-doped phosphate glass composition according to claim 1, wherein said glass composition comprises (based on mol %):

| | |
|---|---|
| $P_2O_5$ | 50.00-70.00 |
| $B_2O_3$ | 5.00-10.00 |
| $SiO_2$ | 1.00-10.00 |
| $Al_2O_3$ | 2.00-13.00 |
| $Nd_2O_3$ | 0.00-5.00 |
| $Yb_2O_3$ | 0.00-5.00 |
| $Er_2O_3$ | 0.00-5.00 |
| $CeO_2$ (or an equivalent amount of $Ce_2O_3$) | 0.5-25.00 |
| $La_2O_3$ | 0.00-22.00 | wherein
  the sum of MO and M'$_2$O is 0.0-15.0 mol %,
  the sum of $P_2O_5$, $B_2O_3$, $SiO_2$, and $Al_2O_3$ is at least 65 mol %,
  all or a portion of $CeO_2$ can be replaced by an equivalent amount of $Ce_2O_3$, in which an equivalent amount of $Ce_2O_3$ means an amount having the same number of moles of Ce as an amount of $CeO_2$,
  the sum of $La_2O_3$, $CeO_2$, $Ce_2O_3$, $Nd_2O_3$, $Yb_2O_3$, and $Er_2O_3$ is not more than 35.00 mol %, and
  the sum of $Nd_2O_3$, $Yb_2O_3$, and $Er_2O_3$ is 0.25-5.00 mol %, and the glass contains at least 0.25 mol % $Nd_2O_3$ and/or at least 0.50 mol % $Yb_2O_3$ and/or at least 0.05 mol % $Er_2O_3$.

22. The Nd-doped or Yb-doped or Er-doped phosphate glass composition according to claim 1, wherein the glass composition contains 0.0-5.0 mol % of MO.

23. In a solid state, mixed glass, laser system comprising a Nd-doped phosphate glass and another Nd-doped glass as the solid gain medium and a pumping source, the improvement wherein said Nd-doped phosphate glass is a Nd-doped phosphate glass according to claim 1.

24. A laser system according to claim 23, wherein the power output of system is at least a pettawatt per pulse or greater.

25. A method for generating a laser beam pulse comprising flashlamp pumping or diode pumping the solid gain medium of the laser system according to claim 23.

* * * * *